Sept. 7, 1926.

H. H. KNEPPER 1,598,728

COILED SPRING FOR CUSHIONS, MATTRESSES, AND THE LIKE

Filed March 16, 1921

WITNESS:

INVENTOR.
Harry H. Knepper.
BY

ATTORNEY.

Patented Sept. 7, 1926.

1,598,728

UNITED STATES PATENT OFFICE.

HARRY H. KNEPPER, OF DETROIT, MICHIGAN.

COILED SPRING FOR CUSHIONS, MATTRESSES, AND THE LIKE.

Application filed March 16, 1921. Serial No. 452,651.

This invention relates to coiled springs for use in formation of spring cushions, mattresses and the like, and the principal object of the invention is to provide a spring structure in which the coiled springs are secured together in rows, each spring of a row being hingedly connected at both the top and bottom to an adjacent spring and in which the construction of the spring and the securing means are such that the springs may be made up in rows with the desired spacing center to center of the individual springs, and in which the retaining means provides a hinge for one of the springs and is fixedly attached to the adjacent spring whereby they are flexibly connected together and may be depressed to various extents without disarrangement.

In the construction of a spring structure for cushions, mattresses and the like I arrange the coiled springs in parallel rows, the coils of each row being connected together in a flexible manner as stated. With some types of cushions the springs are desired to be spaced a greater distance apart than in others and a metal clip is used to attach the upper and lower ends of each of the coils together. In order to avoid the use of clips of various sizes to space the springs the desired distance apart I have devised a clip and so formed the end coils of the spring to provide the desired spacing. A uniform type of clip may be used with slightly differing forms of coils to secure different spacing of the coils. These several objects and novel features of the invention are hereinafter more fully described and claimed, the preferred form of construction being shown in the accompanying drawings in which—

Figure 1:
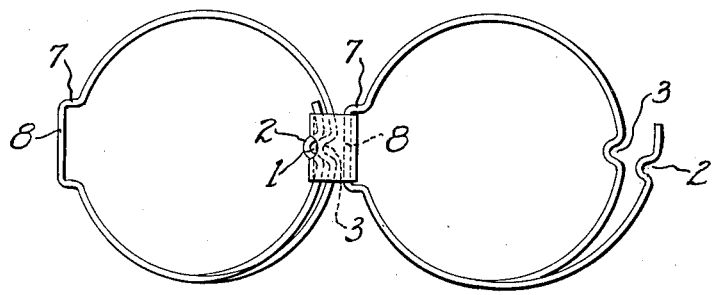
Fig. 1 shows two coils of a series of springs, connected together by a clip and showing the means of arranging the coils to provide the desired spacing.
Figure 2:
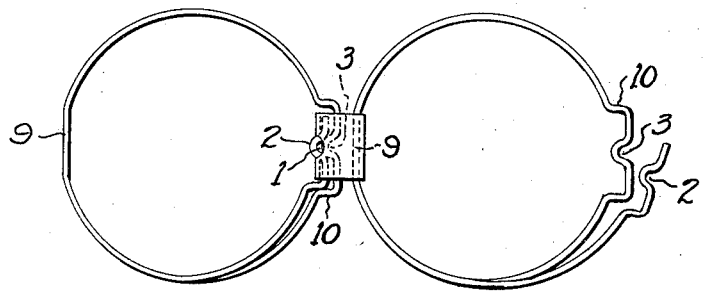
Figs. 2 and 3 show an alternative type of spring structure.
Figure 3:
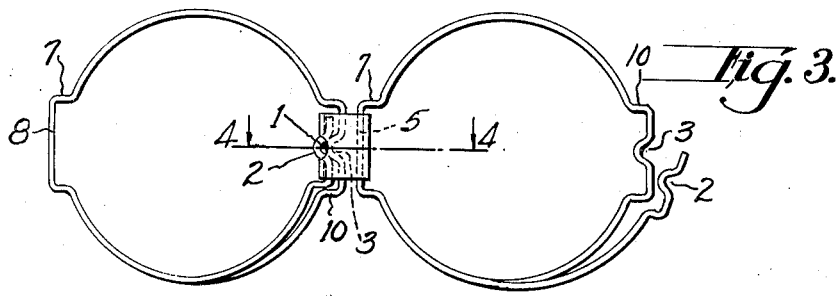
Figure 4:
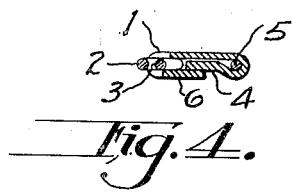
Fig. 4 is a section of the clip taken on line 4—4 of Fig. 3.

The clip, as will be readily understood from Fig. 4, consists of a strip of metal having an aperture 1 therein through which an indentation or bent portion of a coil 2 and 3 may extend. This clip has one leg 4 bent about a portion 5 of one spring permitting the portion 5 to turn in the loop thereof and for this purpose the portion of the spring passing through the clip should be at a right angle to a diametrical line of the coil. The opposite leg 6 of the clip is bent over the indented portions 2 and 3 which lie in parallel relation therewith and, by reason of the indented portion lying between the part 6 and the body of the clip, the said clip is held from turning on the portions 2 and 3. The end of the leg 4 is bent about the part 5 and lies in contact with the body of the clip, as indicated in Fig. 4, with the edge thereof practically in engagement with the indented parts 2 and 3 preventing the movement of the said indented parts out of the aperture 1 and thus fixedly retains the clip in position. For instance as shown in Fig. 1 the end of the coil has the indentation 2 and the next turn has a similar indentation 3 on one side thereof and diametrically opposite the indented portion the first coil of the spring is provided with an offset part 7 providing a straight portion 8 of Fig. 1 corresponding to the straight portion 5 of Fig. 3 and 9 of Fig. 2 about which the part 4 of the clip is bent. This straight portion is necessary in order to permit the spring to turn in the clip and, by providing the offset portion 7, as shown in Fig. 1, the said springs are spaced center to center a certain distance apart. This straight portion may be formed in several ways either by offsetting one side of the coil as shown in Fig. 1, or the indented portions 2 and 3 (which is the same in all cases) may be provided in an offset portion 10 shown in Fig. 3. In this case the offset portion 7 is retained by which a greater spacing center to center of the springs is secured. In Fig. 2 I provide the offset portion 10 as in Fig. 3 and diametrically opposite the offset portion is a straight part 9 which is a chord of the circle formed by the end coil of the spring. In this instance in Fig. 2 the indented portion and offset portion are upon one side of the coil, and this straight portion is provided as shown in the hinging of one member to the other in closer relationship than in Fig. 3. By providing the inwardly bent or indented portions adapted to be nested together as shown in Figs. 1, 2 and 3 the indentations are held by the clip and rotation of the spring is prevented in the clip on that side and where the clip is bent around a straight portion of a coil the spring may turn in the clip. Furthermore, by providing the indented portions nesting together and held in place by the clip as heretofore stated, the end of the coil is held from displacement, the clip providing a tie therefore. Loose spring ends are thus avoided, which are a common source of trouble with other types of fastenings. The offset portions, whether provided upon one side or the other or upon both sides of the coil, may be made a greater or less distance from the center to space the coils the desired distance apart centrally and a spring clip of standard size may be used with any of the coils, thus permitting the rows of springs to be made up with any necessary spacing of the component springs.

Having thus briefly described my invention, what I claim and desire to secure by Letters Patent of the United States is—

1. In a spring structure, a pair of springs each having an end coil and a succeeding turn thereof inwardly indented on one side and diametrically opposite the said portion having the end turn provided with a straight part at a right angle to a diametrical line passing through the indentation, said coils having one of the said parts thereof offset at a distance from the center of the coil greater than the radius of the coil, and said straight portion and indented portion of adjacent springs lying in contiguous spaced relation, and a metal clip about the said contiguous parts having one leg bent about the said straight part to turn thereupon and with the end of the leg positioned between the said spaced portions separating the same and another leg bent about the indented portion holding the same from turning.

2. In a spring structure, a series of coiled springs in which the end turn of each spring is indented on one side and formed with a straight portion on the diametrically opposite side, the straight portion of one spring lying adjacent the indented portion of another, a metal clip having one end bent about the straight portion of one spring to permit turning in the clip and with the end lying in contact with the body thereof, the opposite end of the clip being bent about the indented portion of the adjacent spring and overlying the said first end, the clip having an aperture through which the indentation may project and said first end lying in edge contact with the said indented portion maintaining the indentation in the aperture.

3. A retaining clip for coiled springs comprising the combination with a spring having an end turn and a succeeding turn provided with a sharply bent portion, the said bent portions being adapted to be nested together and the end turn diametrically opposite the said bent portion having a straight part, a clip for connecting two such coils together consisting of a strip of metal of substantially U shaped form, one leg of which is bent about the said straight part of one coil and the other of which is bent about the nested bent portions of the adjacent coil, the clip having an aperture into which the two bent portions may extend and the first leg of the clip being positioned with the terminal edge thereof in contact with the nested bent portions holding the same in the aperture.

In testimony whereof, I sign this specification.

HARRY H. KNEPPER.